Dec. 26, 1950     J. FRENCH     2,535,983
STRIP ANNEALING

Filed May 3, 1947     12 Sheets-Sheet 1

Inventor
John French

Dec. 26, 1950  J. FRENCH  2,535,983
STRIP ANNEALING
Filed May 3, 1947  12 Sheets-Sheet 2
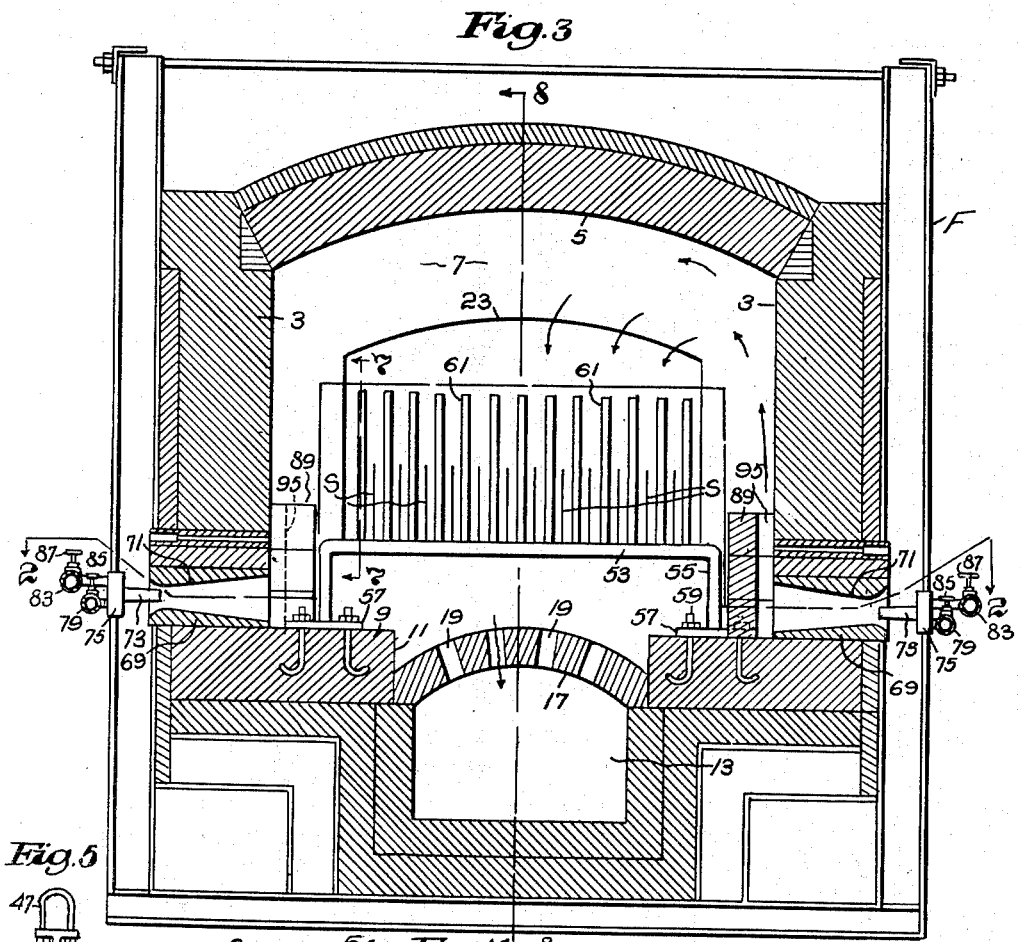
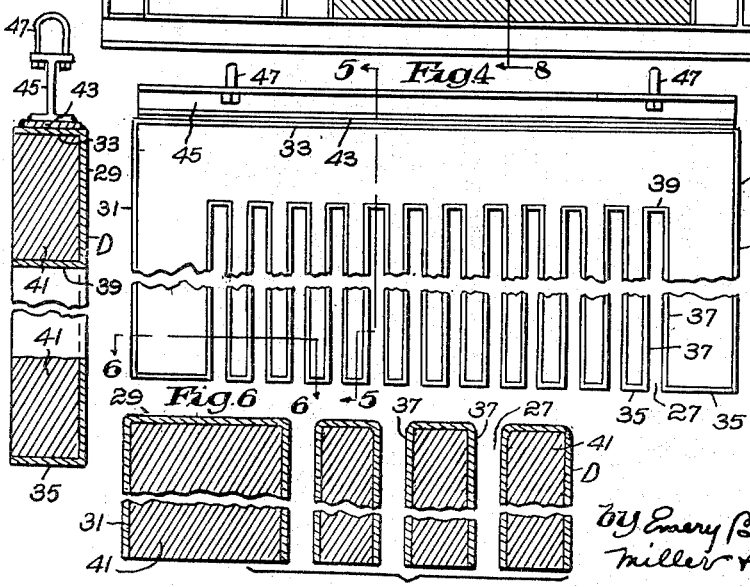
Inventor
John French
by Emery, Booth, Townsend,
Miller & Weidner Attys

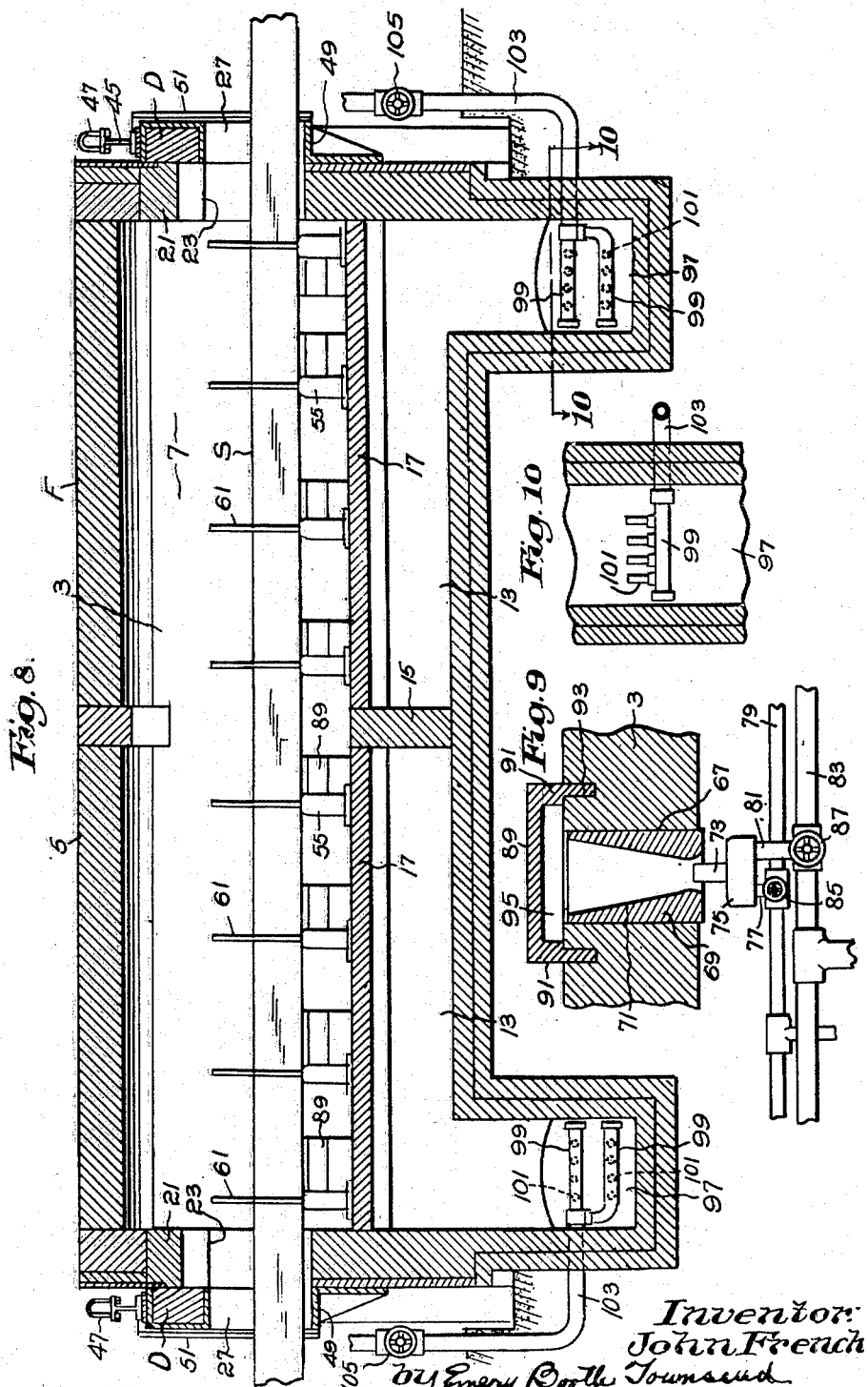

Dec. 26, 1950
J. FRENCH
2,535,983
STRIP ANNEALING
Filed May 3, 1947
12 Sheets-Sheet 4
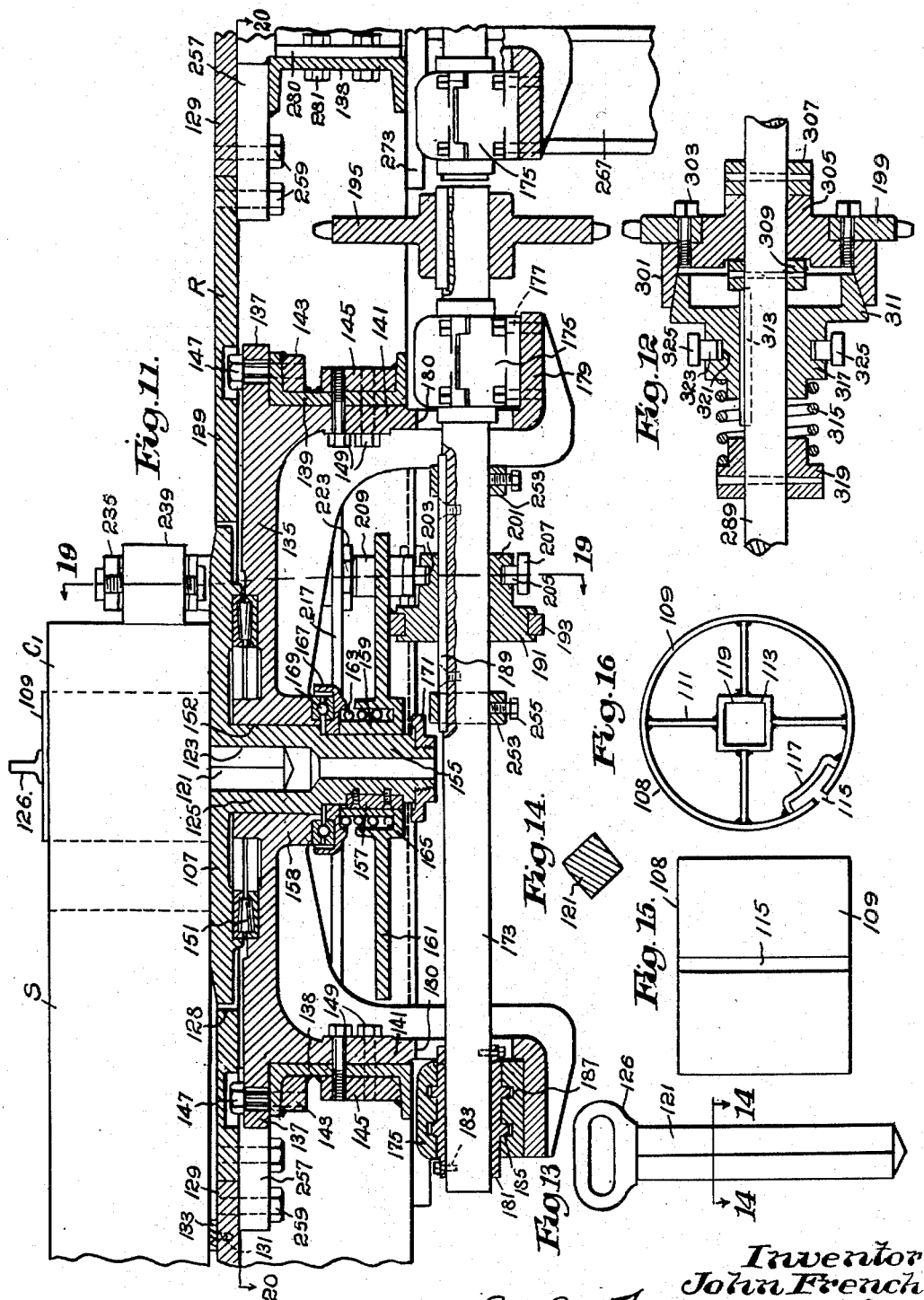
Inventor
John French
By Emery Booth Townsend Miller & Weidner
Attys

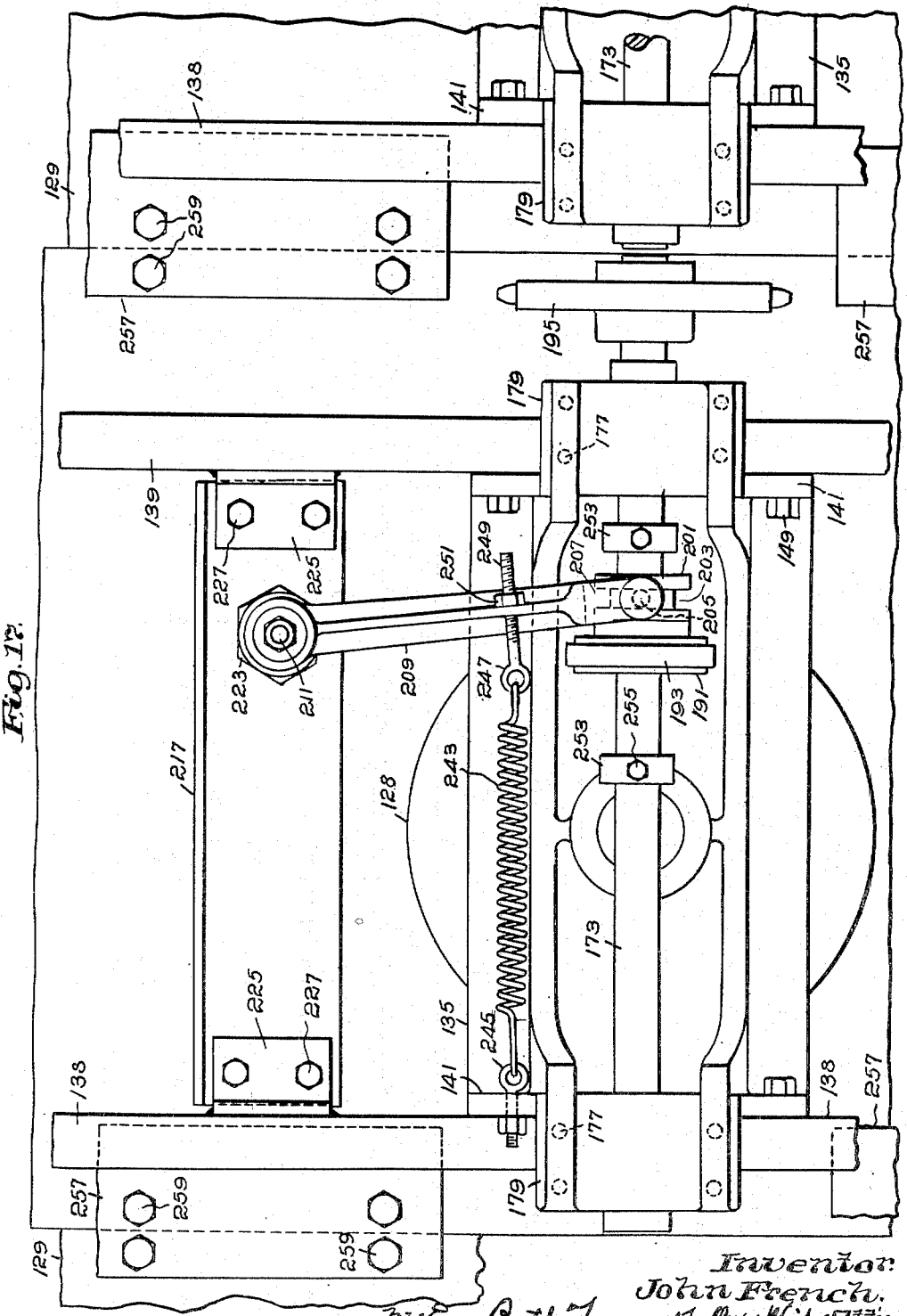

Dec. 26, 1950  J. FRENCH  2,535,983
STRIP ANNEALING
Filed May 3, 1947  12 Sheets-Sheet 6

Inventor
John French

Dec. 26, 1950 J. FRENCH 2,535,983
STRIP ANNEALING
Filed May 3, 1947 12 Sheets-Sheet 7

Inventor
John French
by Emery, Booth, Townsend, Mullen & Neuman
Attys

Dec. 26, 1950  J. FRENCH  2,535,983
STRIP ANNEALING
Filed May 3, 1947  12 Sheets-Sheet 8
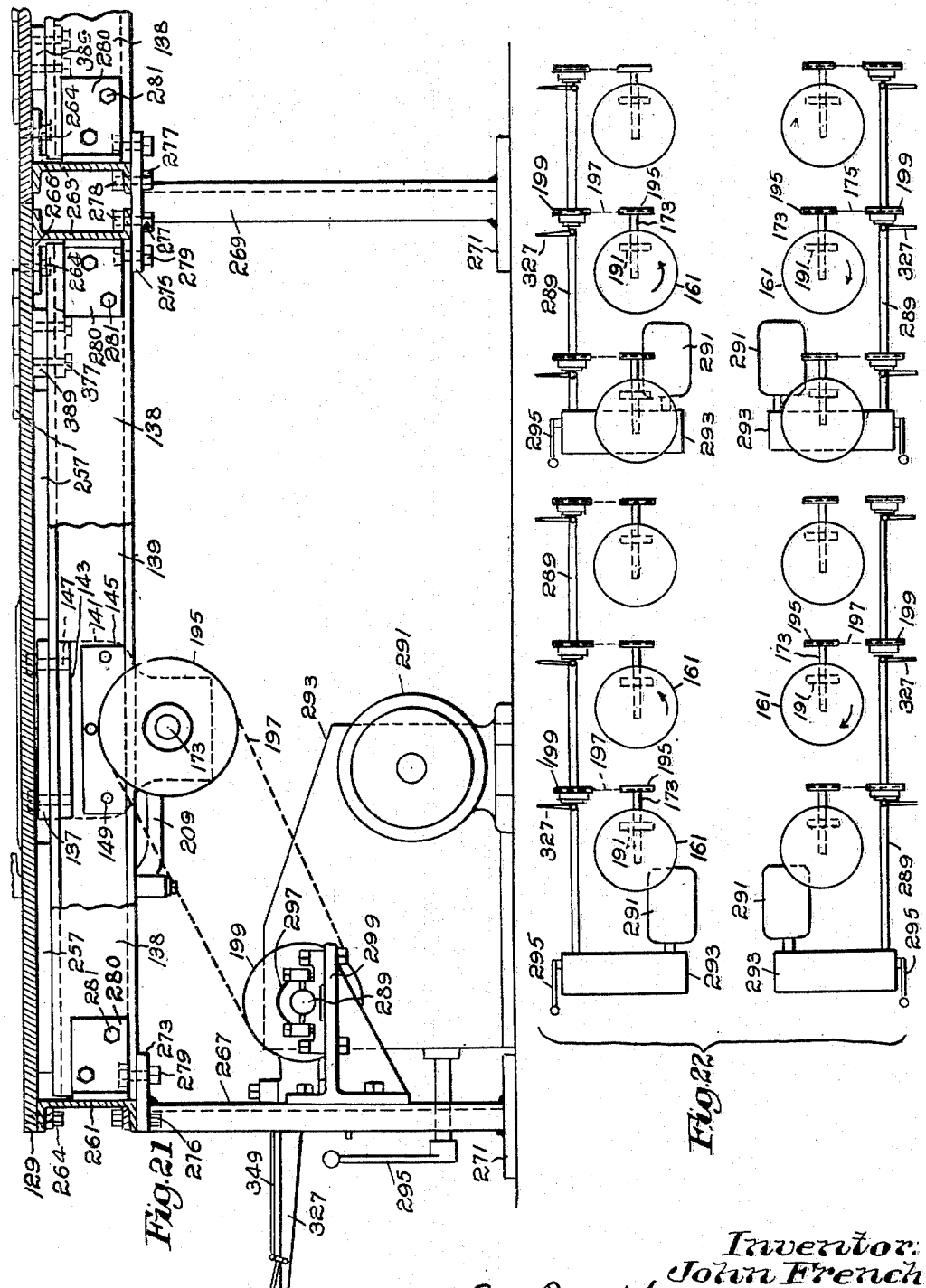
Inventor:
John French
by Emery Booth Townsend Miller & Widner
Attys

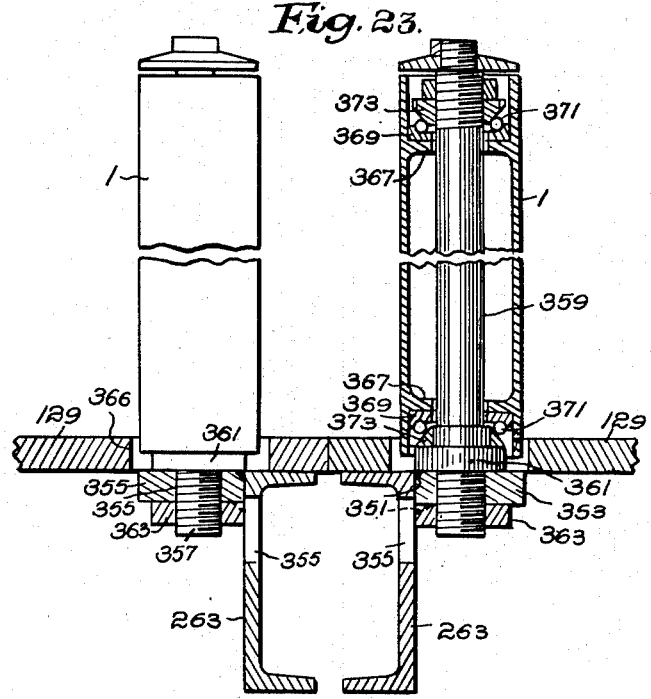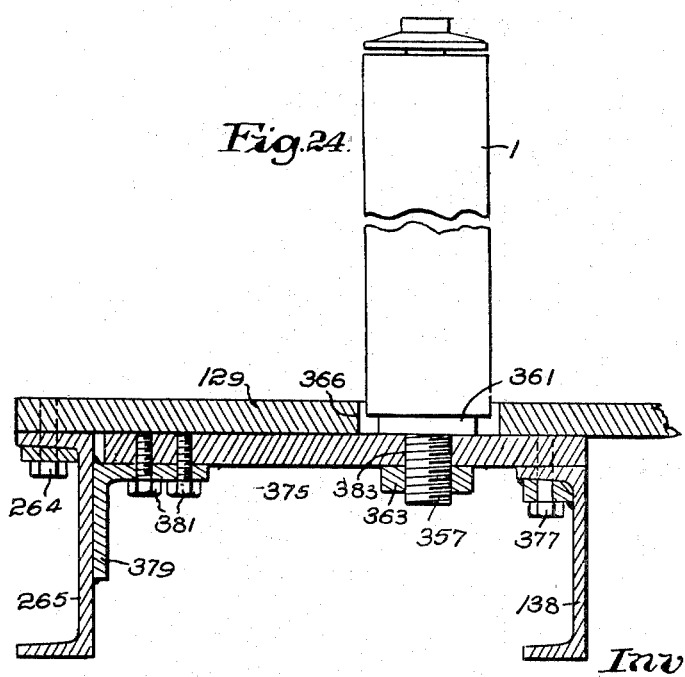

Dec. 26, 1950   J. FRENCH   2,535,983
STRIP ANNEALING

Filed May 3, 1947   12 Sheets-Sheet 10

Inventor:
John French,
by Emery Booth Townsend Miller & Westyn
Attys

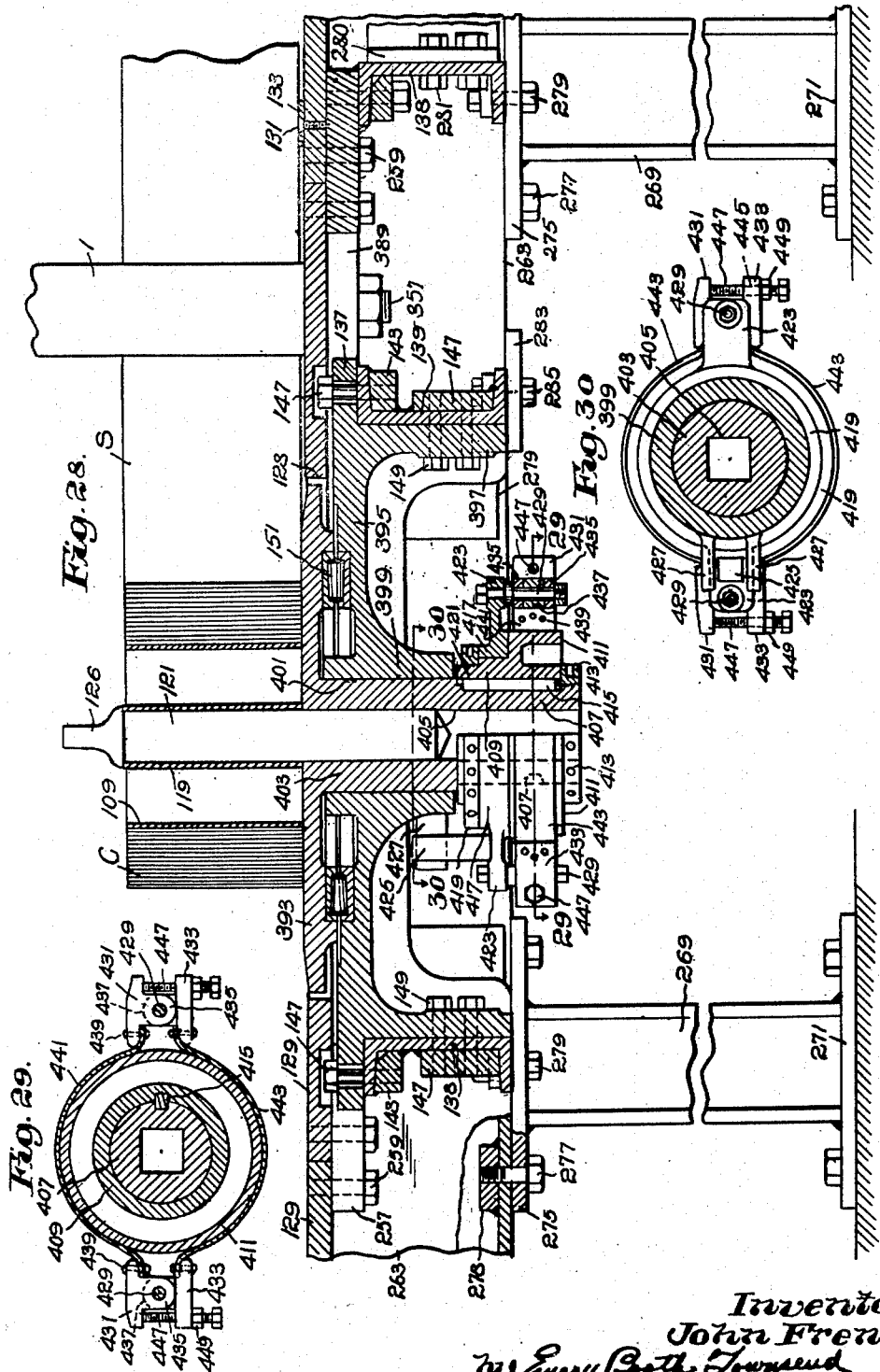

Dec. 26, 1950 J. FRENCH 2,535,983
STRIP ANNEALING
Filed May 3, 1947 12 Sheets-Sheet 12
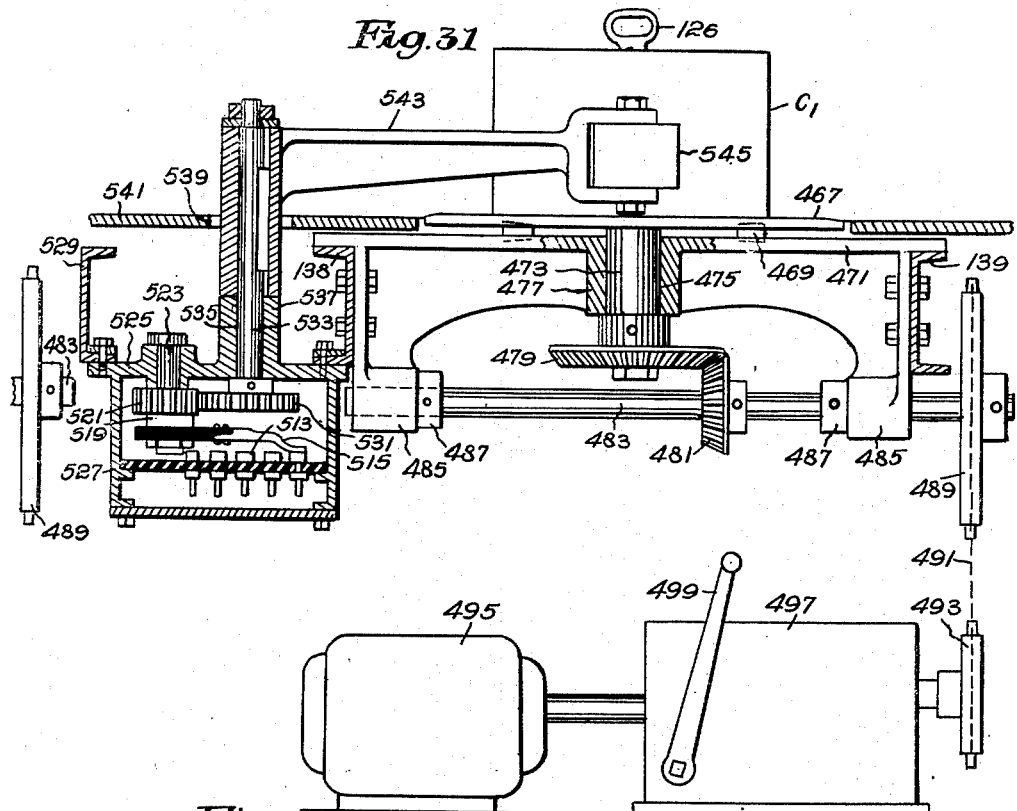
Inventor:
John French,
by Barry Booth Townsend Miller & Weidner
Attys Patented Dec. 26, 1950

2,535,983

UNITED STATES PATENT OFFICE 2,535,983

STRIP ANNEALING

John French, Ecorse, Mich., assignor to Revere Copper and Brass Incorporated, New York, N. Y., a corporation of Maryland Application May 3, 1947, Serial No. 745,873

14 Claims. (Cl. 263—3)

1

My invention relates to methods of and apparatus for annealing and securing the desired grain size of metallic strip.

The invention has among its objects an improved method of and apparatus for the above purposes, having provision for simultaneously annealing a plurality of metallic strips in like manner, or, if desired, annealing each strip or some of them differently. These and the other objects of the invention, however, will be best understood from the following description when read in the light of the accompanying drawings of several embodiments of apparatus according to the invention, while the scope of the invention will be more particularly pointed out in the appended claims.

In the drawings—

Fig. 3 is a section on the line 3—3 of Fig. 2, on an enlarged scale;

Fig. 4 is an elevation of one of the end doors for the furnace, with parts broken away;

Fig. 5 is a section on the line 5—5 of Fig. 4;

Fig. 6 is a section on the line 6—6 of Fig. 4, on an enlarged scale;

Fig. 7 is a section on the line 7—7 of Fig. 3, with parts omitted;

Fig. 8 is a section on the line 8—8 of Fig. 3, on a reduced scale;

Fig. 9 is a fragmentary section on the line 2—2 of Fig. 3, on an enlarged scale;

Fig. 10 is a section on the line 10—10 of Fig. 8;

Fig. 11 is a section on the line 11—11 of Fig. 1, on an enlarged scale, and with parts omitted;

Fig. 12 is a section on the line 12—12 of Fig. 26;

Fig. 13 is an elevation of a pin for detachably securing the reels for the coils of strip to the rotary pay-off and rewinding tables;

Fig. 14 is a section on the line 14—14 of Fig. 13;

Fig. 15 is an elevation of one of the reels;

Fig. 16 is a plan of the reel according to Fig. 15;

Fig. 17 is a bottom view of a fragment of the coil rewinding platform, with parts omitted and parts broken away;

2

Figure 1:
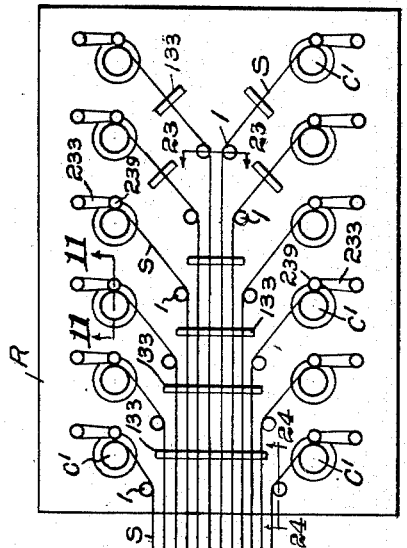
Fig. 1 is a more or less diagrammatic plan view of apparatus according to the invention.
Figure 20:
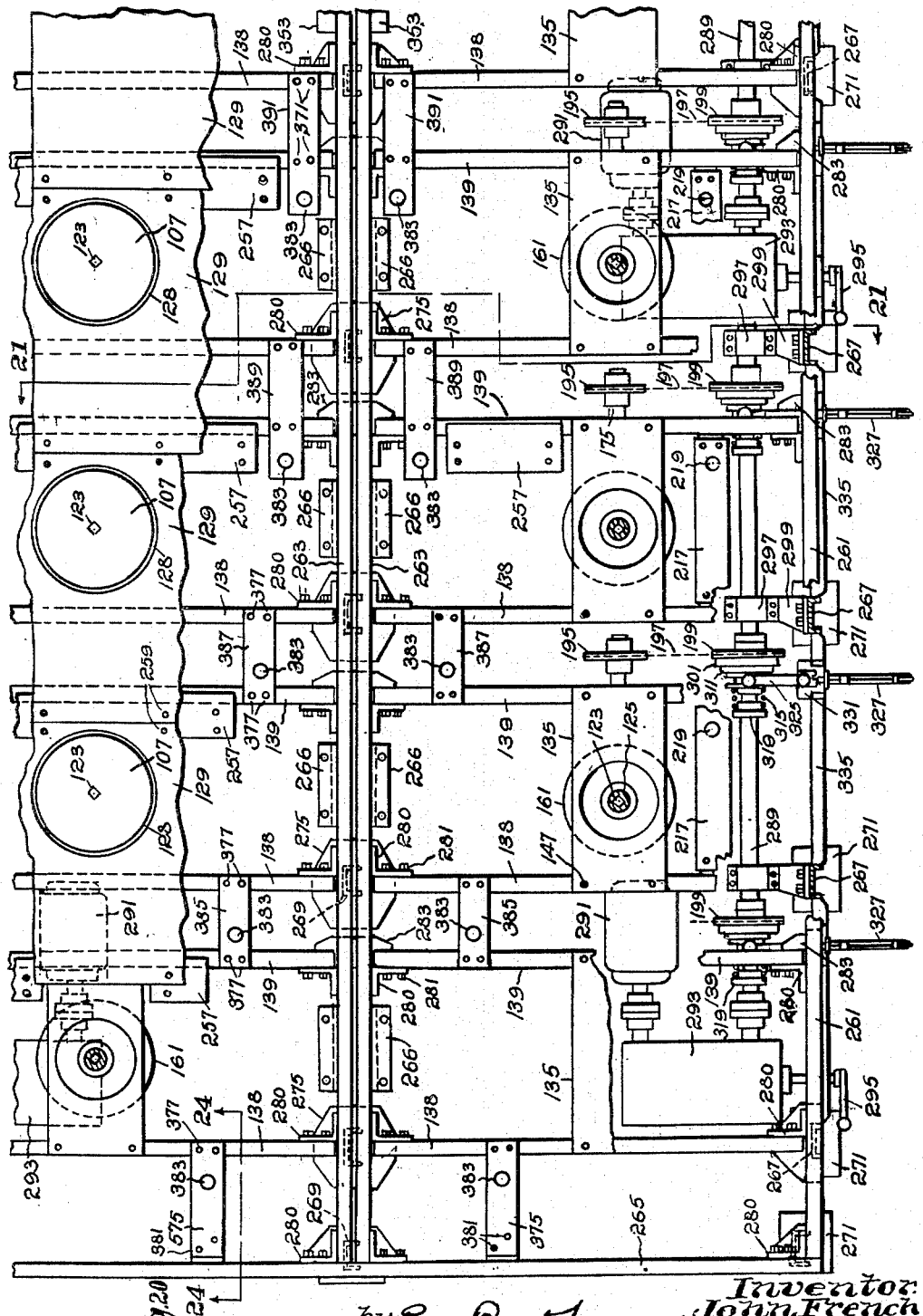
Fig. 20 is a plan view of a fragment of the coil rewinding platform, with parts broken away, for the most part corresponding to a section on the line 20—20 of Fig. 11 on a reduced scale.
Figure 25:
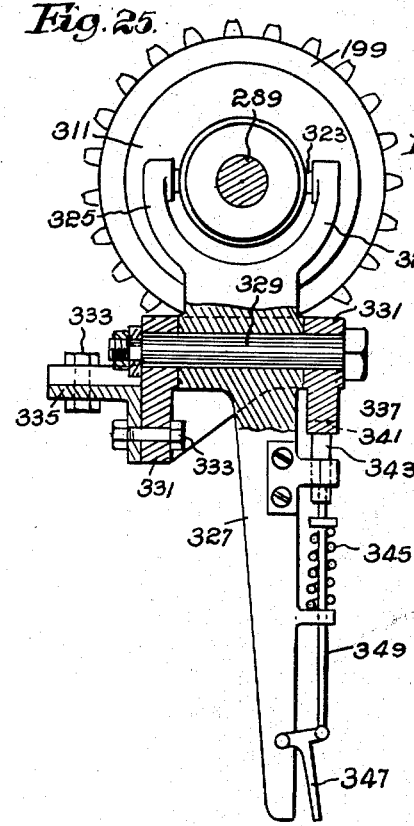
Figure 26:
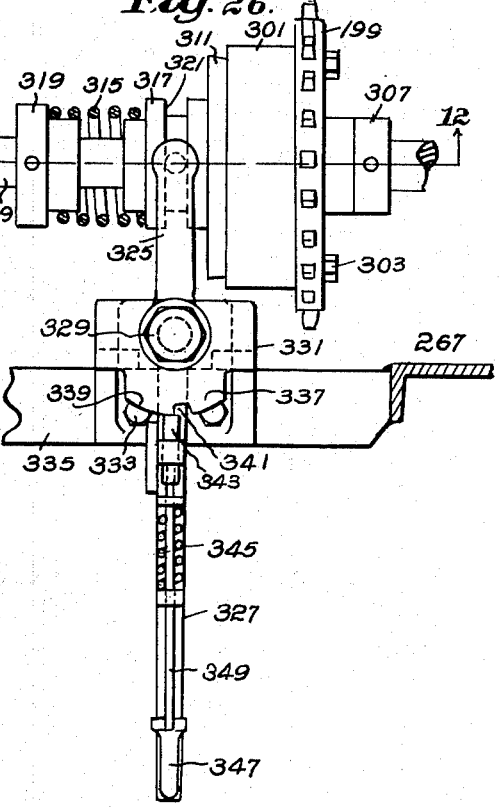
Figure 27:
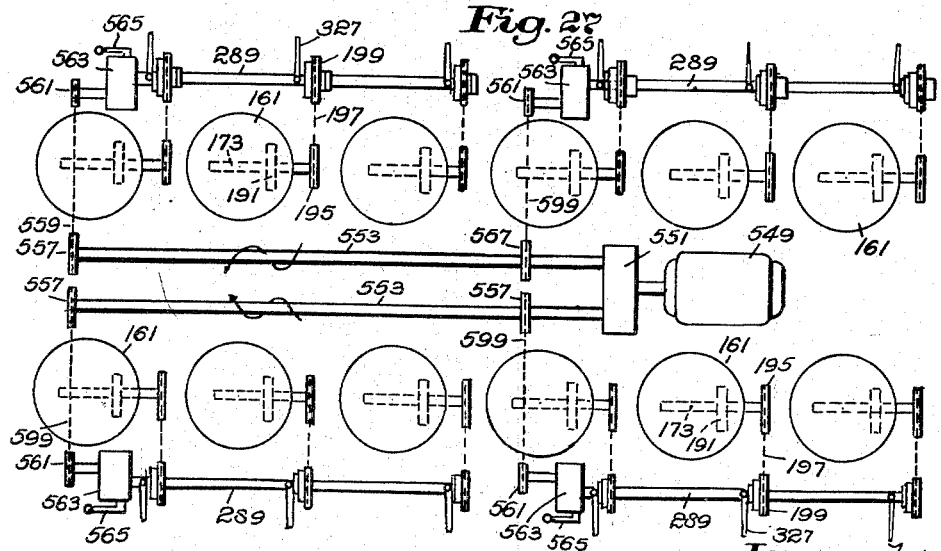

Fig. 21 is a section on the line 21—21 of Fig. 20, on an enlarged scale, and with parts omitted;

Fig. 22 is a diagram showing the arrangement of apparatus, at the coil rewinding platform, according to Figs. 11, 12, and 17 to 21;

Figs. 23 and 24 are, respectively, sections on the lines 23—23 and 24—24 of Fig. 1, the section line 24—24 also being applied to Fig. 20 for convenience in following the drawings;

Fig. 25 is an end elevation of the clutch mechanism and associated parts according to Fig. 26, with parts broken away;

Fig. 26 is a plan, on an enlarged scale, of one of the clutches and associated parts shown in Fig. 20;

Fig. 27 is a diagram showing a modified arrangement of apparatus at the rewinding platform;

Fig. 28 is a section on the line 28—28 of Fig. 1, on an enlarged scale;

Figs. 29 and 30 are, respectively, sections on the lines 29—29 and 30—30 of Fig. 28;

Fig. 31 is a more or less diagrammatic section, corresponding to Fig. 11, showing the modified form of mechanism for operating one of the rotary coil rewinding tables;

Fig. 32 is a schematic electric wiring diagram of parts shown by Fig. 31; and

Fig. 33 is a schematic diagram showing a modified way of controlling the clutches of the apparatus according to Figs. 20, 21, 22 and 27.

According to the invention coils C (Fig. 1) of metallic strip S are unwound at a pay-off platform or station P and rewound into coils $C_1$ at a rewinding platform or station R, the length of the strip between the coils passing through a heat treating furnace F for annealing the strip and giving it the desired grain size. The coils C and $C_1$ are positioned at the platforms P and R with their axes vertical so that the strips pass through the furnace F on edge. By passing the strips about vertical guide rollers 1 at the pay-off and rewinding platforms the portions of the strips passing through the furnace may be maintained in relatively closely spaced relation.

Figure 2:
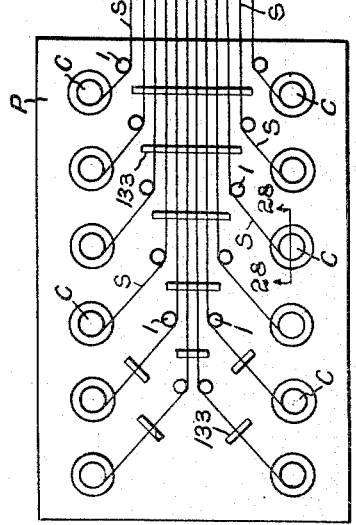
Fig. 2 is a longitudinal section, of the furnace for annealing the strip, on the line 2—2 of Fig. 3.

The furnace employed may be that shown by Figs. 2 to 10. As illustrated, the furnace comprises opposite side walls 3 supporting an arched roof 5 (Fig. 3) to form an elongated strip heating chamber 7 (Figs. 2 and 8). The side walls 3 rest on the bottom wall 9 formed intermediate its width with an opening 11 (Fig. 3) extending throughout the length of the chamber 7. Beneath this opening are flues 13 extending in opposite directions from a centrally positioned partition wall 15 (Fig. 8). The roofs 17 of these flues are arched, as shown in Fig. 3, and extend from one side to the other of the opening 11. Distributed throughout the extent of the roofs 17 are openings 19 therein, which openings establish communication between the strip heating chamber 7 and the flues.

The end walls 21 of the heating chamber 7 of the furnace F are shown as provided with openings 23. These openings are closed by removable doors D, best illustrated in Figs. 4, 5 and 6. As shown, the doors are formed to provide spaced relatively narrow slots 27 through which the strips pass in entering and leaving the furnace chamber, these slots being open at their bottoms so that the doors may be placed in position and removed therefrom without interfering with the strips.

In the construction shown the door D comprises a metallic casing having a front wall 29, opposite end walls 31, a top wall 33, and a bottom wall 35. Connected with the bottom and front wall the casing is formed to provide the side walls 37 of the slots 27. At their upper ends the side walls 37 of each slot are connected by the top walls 39 of the slots, these top walls also being connected to the door front wall 29. As shown, the entire side of the casing facing the heating chamber 7 of the furnace is open, and the entire interior of the casing is filled from that side with a mass of refractory heat insulating material 41. Conveniently, the metallic casing just described is formed of suitably shaped sheets and strips comprising the parts of the casing enumerated, which parts are secured together at their edges by welding to form an integral structure.

As further illustrated, each door D has welded to its upper edge an elongated plate 43 extending substantially the length of the door, to which plate is welded the lower flange of an I-beam 45 also extending substantially the length of the door. This plate and I-beam give the door rigidity. As shown, carried by the upper flange of the I-beam are the spaced U-shaped members 47, which members provide eyes to which a crane or other hoist may be attached for raising and lowering the door.

As shown, the doors D when in position rest upon sills in the form of brackets 49 (Fig. 8) carried at the outer sides of the end walls 21 of the furnace. Channel-shaped members 51 carried by these end walls act as guides for positioning the doors and for retaining them in position when placed on the sills 49.

In the furnace the strips S are supported on horizontal bars 53, against the upper surfaces of which bars the lower edges of the strips S slidably rest. At their ends these bars have the downturned portions 55 forming posts for supporting the bars. The lower ends of the portions 55 are shown as secured to plates 57, preferably by welding, these plates resting upon the upper surface of the bottom wall 9 of the furnace and being secured thereto by anchor bolts 59. Carried by the bars 53 are spaced vertical pins 61 the lower ends of which, as shown, extend through openings 63 (Fig. 7) in the bars and are welded to the bars at the under side thereof, as indicated at 65. Preferably the bars 53, plates 57 and pins 61 are formed of heat refractory metal, such as one of the iron alloys having a high chromium content.

The furnace is preferably of the gas heated type. As illustrated, each of the side walls 3 of the furnace is provided with spaced openings 67 (Fig. 9), each receiving a refractory sleeve 69 having a through opening 71, which latter is outwardly flared as it extends toward the interior of the furnace. As best shown in Fig. 9, associated with each flared opening 71 is a nozzle 73 for projecting a combustible mixture of air and gas into said opening for forming a torch-like flame. This nozzle is supplied from a mixing chamber 75. The mixing chamber, as shown, is supplied with compressed air through a pipe connection 77 leading from a compressed air pipe 79, and is supplied with gas under pressure through a pipe connection 81 from a gas main 83. Valves 85 and 87, controlling flow of air and gas, respectively, through the connections 77 and 81, serve as means for the operator to control the mixture and flame.

In front of each flared opening 71 is a heat refractory baffle having a vertical wall 89 and side walls 91. The side walls 91 have portions 93 built into the side walls 3 of the furnace chamber 7, both the side walls 91 and the wall 89 of the baffle resting on the bottom 9 of the furnace chamber so as to form in front of each flared opening 71 a passage 95 closed at its bottom and open at the top. The products of combustion from the burners striking these baffles are deflected by the baffles upwardly, and by the side and top walls of the furnace inwardly and downwardly, so as to discharge from the furnace chamber through the bottom openings 19 into the flues 13, as indicated by the arrows in Fig. 3. In this way the products of combustion are caused to pass downwardly between the several strips S in the furnace and heat them.

Each flue 13 of the furnace is shown as communicating with a passage 97 (Fig. 8) leading to a stack (not shown). In each of these passages is shown a pair of manifolds 99 each supplying a group of nozzles 101. The manifolds 99 are supplied with pressure fluid, such as steam or compressed air, by pipes 103 controlled by valves 105. Jets of steam or compressed air issuing from the nozzles 101 serve by ejector action to subject the furnace chamber 7 to gas withdrawal and force the gas withdrawn toward the stack. Preferably the force of the jets is so controlled by the valves 105 that the pressure in the furnace chamber 7 is maintained at about atmosphere, so as to prevent either escape of products of combustion through the slots 27 in the furnace doors or entrance of outside air into the furnace chamber through those slots.

Referring particularly to Figs. 11 and 13 to 21, each coil $C_1$ of strip at the rewinding platform or station R is supported on a circular disk-like rotary table 107. The reel 108 on which the coil is rewound, as best shown by Figs. 15 and 16, comprises a cylindrical shell 109 connected by spokes 111 to a hub 113, the hub and spokes being coextensive with the axial length of the shell. As shown, the shell is provided with a lateral slot 115, the portions of the shell at opposite sides of the slot being connected by a U-shaped member 117. The shell is preferably built up of the parts enumerated by a welding operation.

Figure 18:
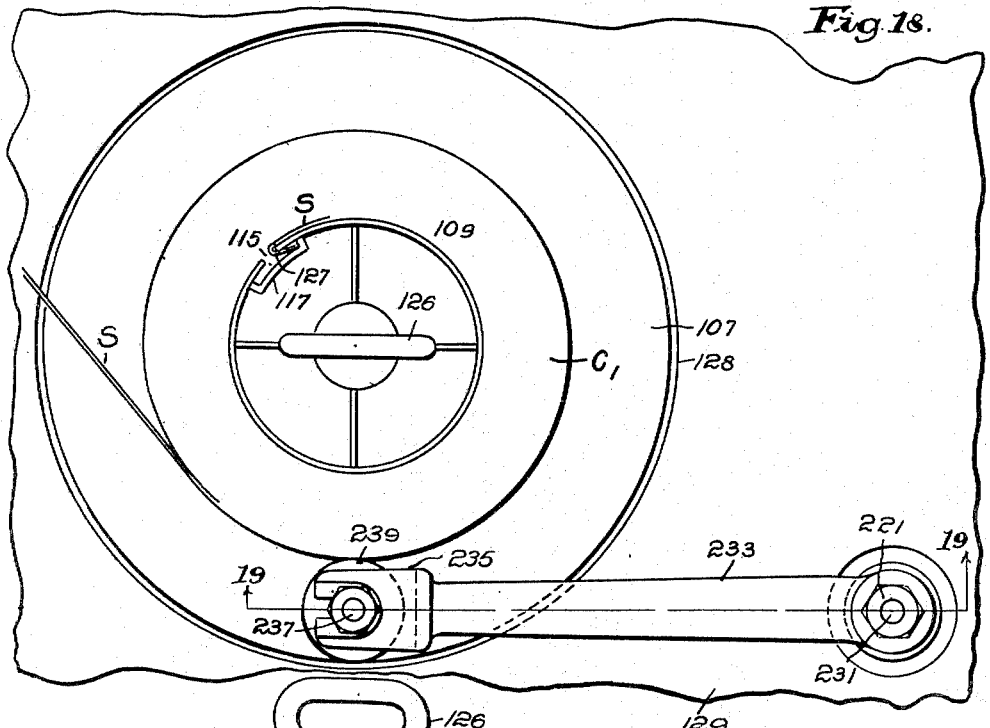
Fig. 18 is a plan of the parts according to Fig. 11.
Figure 19:
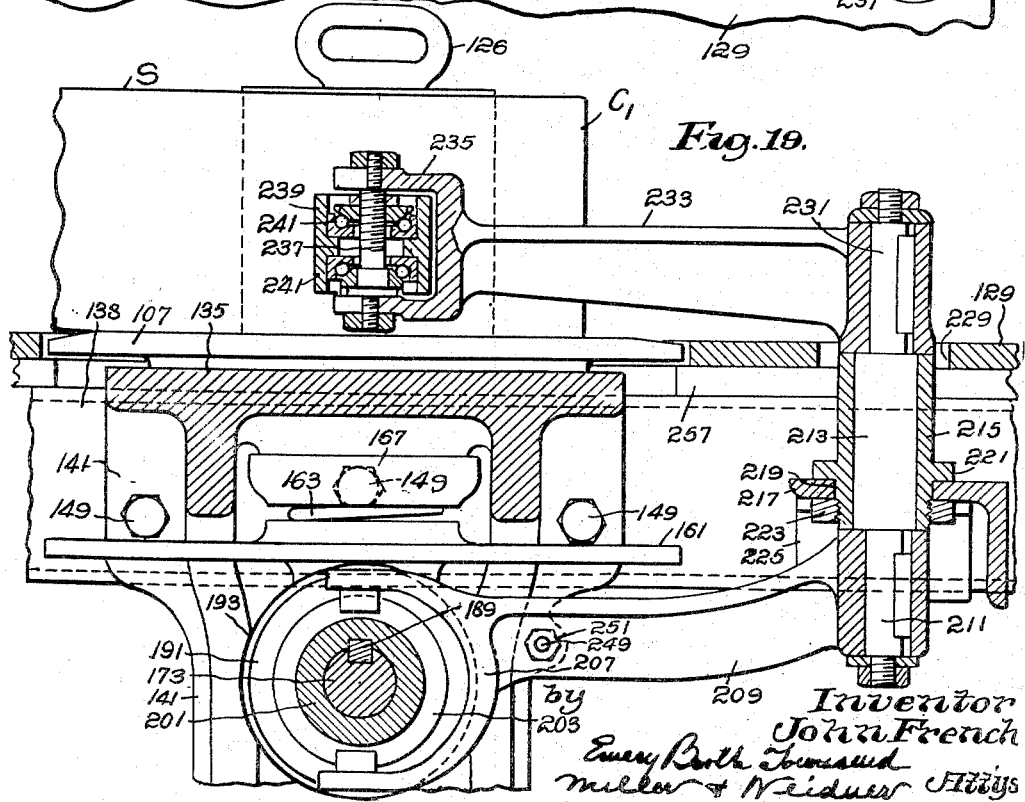
Fig. 19 is a section on the line 19—19 of Figs. 11 and 18.

The hub 113 of the reel 108 is formed with a bore 119 which is shown as square in cross-section. After the reel is placed on the table 107, with the axis of the reel vertical, a pin 121 (Figs. 13 and 14), of the same cross-sectional shape as the bore 119, may be passed through that bore into the bore 123 of the spindle 125 of the table, the bore 123 being of the same cross-sectional shape as the pin so that the reel is formed to rotate with the table as the latter is rotated. As shown, the pin is formed with an enlarged diameter head 126 shaped to form a handle grip. By inserting the end 127 of the strip S in the slot 115 of the reel, as shown in Fig. 18, the strip will be rewound on the reel when the table 107 is rotated.

As shown, the rotary table 107 is received within a circular opening 128 in one of the plates 129 forming the top of the rewinding platform R. Preferably, the upper surface of the rotary table is positioned slightly above the upper surface of the plate, so that the lower edge of the strip will not unduly scrape over the platform top and the peripheral edges of the table 107 will not scrape against said edge. For supporting the strip as it passes over the platform, conveniently secured to the upper side of the plates 129, by screws 131, are strips 133 (Figs. 1 and 11), of metal, wood or suitable composition material.

The rotary strip rewinding table 107 is shown as supported by a casting 135 (Fig. 11) having edge flanges 137 resting on the upper flanges of oppositely facing elongated channel-irons 138 and 139, the casting also having downwardly projecting flanges 141 abutting the webs of these channel-irons. Welded to the inner surfaces of the channel-irons are blocks 143 and 145, into which are tapped bolts 147 and 149 respectively, these bolts extending through openings in the flanges 137 and 141 for removably securing the casting to those channel-irons.

The rotary table 107, as shown in Fig. 11, is supported on the casting 135 by a roller bearing 151, the spindle 125 of the table extending into and rotatably fitting the bore 152 of the hub portion 152 of the casting so that said hub forms a bearing for the spindle and aids in centering it relative to the casting.

The spindle 125 of the rotary table 107 is shown as provided with a reduced diameter portion 155 below the hub 153 of the casting 135. To this reduced diameter portion is splined, by means of a key 157, the hub 159 of a friction disk 161. Surrounding the hub 159 is a compression spring 163, this spring at its lower end bearing against the portion 165 of the hub 159, and at its upper end bearing against a collar 167. The collar 167 is sleeved on the reduced diameter portion 155, and operatively bears against the lower end of the hub 153. A ball bearing 169 is shown as interposed between the hub 153 and the collar, so that the spring and collar may readily rotate with the spindle 125 and friction disk 161. On the lower end of the reduced diameter portion 155 of the spindle for the rotary table 107 is screw-threaded a collar 171, which serves to limit the downward movement of the disk relative to the spindle.

Beneath the friction disk 161 is a shaft 173, rotatably supported in split bearing blocks 175 secured by bolts 177 to brackets 179, these brackets being formed integrally with the lower end portions of the flanges 141 of the castings 135, while said flanges are formed with openings 180 through which the shaft extends. As shown, the split bearings 175 are of the combined lateral and thrust bearing type, being provided with sleeves 181 which are secured to the shaft by bolts 183, which sleeves have thrust collars 185 received in annular grooves 187 formed in the halves of the split bearing 175.

As illustrated, the shaft 173 is provided with an elongated key 189 for splining thereto a friction pinion 191 for driving the friction disk 161 and hence the rotary rewinding table 107. As shown, the disk is provided with a peripheral portion 193, of leather or composition material, which bears against the under side of the disk so as to augment the friction between the two. The spring 163 also acts to augment this friction, and further acts to maintain the friction disk and friction pinion in continuous contact by eliminating any tendency of a poor driving connection between the disk and pinion should the former tend to wabble because of wear of parts or inaccuracy in their manufacture. For driving the shaft 173 the same has fixedly secured thereto a sprocket wheel 195, driven by a chain 197, diagrammatically illustrated in Fig. 21, from a second sprocket wheel 199 (Figs. 12, 20, 21 and 26).

In the apparatus illustrated, for causing the strips S to be rewound into the coils $C_1$ at substantially constant linear speeds, means are provided progressively to shift each friction pinion 191 radially outwardly of its associated friction disk 161 as the coil rotated thereby progressively increases in diameter. It will be observed from Fig. 11 that the vertical center line of the friction pinion, as viewed in that figure, is directly under the outer vertical edge of the coil. By shifting the friction pinion radially outwardly of the friction disk, to maintain this relation as the coil increases in diameter, the strip will be rewound into the coil at a substantially constant linear speed. By so rewinding the coil all portions of the strip lengthwise thereof will be heat treated the same as the strip passes through the heating furnace.

For shifting each friction pinion 191 in the way above explained the hub portion 201 (Figs. 11, 17 and 19) thereof is shown as provided with an annular circumferential slot 203, which slot receives pins 205 carried by the bifurcations of the bifurcated end 207 of a lever 209. This lever is fixedly but removably secured to the lower reduced diameter portion 211 of a pin 213 journalled in a bearing 215 carried by an angle-iron 217. As shown, the upper web of the angle-iron is provided with an opening 219 through which the lower end portion of the bearing extends, the bearing having integrally formed therewith an exterior annular flange 221 which is clamped against the upper side of the upper web of the angle-iron by a nut 223 screw-threaded on said lower portion, the nut bearing against the under side of said upper flange. This angle-iron, as best shown in Fig. 17, at opposite ends is supported by the brackets 225 welded to the channel-irons 138 and 139, the angle-iron resting on and being secured by bolts 227 to said brackets. The pin 213 projects through an opening 229 (Fig. 19) in the adjacent rewinding platform top plate 129 to above said platform, where it has a reduced diameter portion 231 to which is fixedly but removably secured a lever arm 233. The lever arm 233 has a bifurcated end 235, to the bifurcations of which are fixedly but removably secured the opposite ends of the spindle 237 of a roller 239, the roller being mounted on the spindle by ball bearings 241. The roller 239 is adapted to bear against the outer surface of the associated coil $C_1$. Consequently, as the coil progressively increases in diameter, the lever arms 233 and 209 will be swung progressively to shift the friction pinion 191 to the right, as viewed in Figs. 11 and 17, and thus maintain substantially constant the linear speed at which the strip is rewound into the coil $C_1$.

For holding the roller 239 against the coil $C_1$ a tension spring 243 (Fig. 17) is provided. This spring is connected at one end to an eye-bolt 245 secured to one of the vertical flanges 141 of the casting 135. At its other end the spring is connected to an eye-bolt 247 having a long screw-threaded shank 249 extending through a perforation in the lever 209. By means of the nut 251 on this shank the tension of the spring may be varied.

For providing limit stops for the movement of the friction pinion 191, the shaft 173 is provided with collars 253 (Figs. 11 and 17), which may be adjustably fixed in selected positions longitudinally of the shaft by set screws 255.

The plates 129 forming the rewinding platform top are shown as supported, at their edges which extend transversely of the platform, by the channel-irons 138. As shown, to the upper flanges of these channel-irons are welded bars 257 (Figs. 11, 17 and 20) extending longitudinally of said channel-irons and projecting laterally from one side of the upper flanges thereof. The plates 129 adjacent their abutting edges rest on and are secured by bolts 259 to these bars, the bolts which extend through openings in the bars from their under side being tapped into the plates.

As illustrated, along the longitudinal edges of the rewinding platform are channel-irons 261 (Figs. 20 and 21) extending throughout substantially the length of said edges. At the center of the platform is shown a pair of closely adjacent longitudinally extending channel-irons 263 also extending substantially the length of the platform. At each end of the platform is a transverse channel-iron 265 extending transversely across the platform. The platform top plates 129 rest upon the upper flanges of these channel-irons as well as upon the bars 257 carried by the transversely extending channel-irons 138, the upper surfaces of the bars 257 being in the same plane as the upper flanges of the channel-irons 261, 263 and 265. In addition to being secured to the bars 257 by the bolts 259 (Fig. 11), and to the upper flanges of the channel-irons 261 and 265 by bolts 264 (Figs. 21 and 24), they are secured by similar bolts 264 to angle-irons 266 (Figs. 20 and 21) welded to the channel-irons 263 at their upper edges.

At spaced points intermediate their length the channel-irons 261 and 263 are supported by posts 267 and 269 (Figs. 20, 21 and 28) which are welded at their lower ends to plates 271 resting upon the floor and secured thereto in any suitable manner. Welded to the upper ends of the posts 267 are horizontal plates 273, while welded to the upper ends of the posts 269 are horizontal plates 275. The channel-irons 261 and 263 rest upon these plates, the channel-irons 261 being secured to the plates 273 by bolts 276 (Fig. 21), while the channel-irons 263 are secured to the plates 275 by bolts 277 (Figs. 21 and 28) extending from the under sides of the plates 275 through perforations in said plates and the lower flanges of the channel-irons, the bolts 277 being tapped into the blocks 278 welded to the upper sides of said flanges of the channel-irons 263. The channel-irons 138 at opposite ends also rest upon the projecting portions of these plates and are secured thereto by bolts 279. Also, welded to the webs of the channel-irons 261 and 263 are brackets 280 to which the end portions of the channel-irons 138 are secured by bolts 281. The transversely extending channel-irons 139 at opposite ends rest upon plates 283 welded to the under sides of the longitudinally extending medial and edge channel-irons 261 and 263 to which they are secured by bolts 285 (Fig. 28). As shown in Fig. 20, the channel-irons 139 are also secured at opposite ends to the longitudinally extending channel-irons 161 and 163 by further brackets 280 welded to the webs of the channel-irons 261 and 263, the channel-irons 139 being detachably secured to these brackets by further bolts 281.

The sprocket wheels 199 for driving the sprocket wheels 195 are shown as operatively mounted upon shafts 289 (Figs. 12, 20, 21 and 22). Each of these shafts is shown as driven by an electric motor 291 connected to the shaft through a change speed gear, the casing for which latter is shown at 293 (Figs. 20 and 21). This change speed gear, as shown, has a shiftable gear ratio adjusting lever 295, which lever may be manually shifted by the operator to cause the shaft 289 to be rotated by the gearing at any of selected speeds. So regulating the speed at which the shaft is rotated will regulate the linear speed at which the strip S is moved through the furnace, and therefore regulate the degree to which the strip is annealed without its being necessary to vary the temperature of the furnace. As illustrated by Fig. 20 and the diagram according to Fig. 22, there are four shafts 289 each driven by a separate motor 291 through a separate change speed gear, and each driving a group of three rotary rewinding tables 101. In this way groups of rewinding tables may be rotated at different speeds to cause the strips being rewound by any group to pass through the furnace at a different speed from the strips being rewound by another group, so that the strips of one group will be heat treated and annealed differently from those being rewound by the other group.

It will be observed from Fig. 1 that the row of coils being rewound at the upper row of coils at the rewinding station, as viewed in that figure, rotate in the opposite direction from the row of coils being rewound at the lower portion of said figure. Consequently, in the apparatus illustrated, the motors 291 for the upper row of coils rotate in the opposite direction from those for the lower row, as indicated by the arrows in Fig. 22 applied to the friction disks 161.

In the apparatus illustrated each shaft 289 is rotatably supported by bearings 297 carried by brackets 299 bolted to the posts 267, as shown in Figs. 20 and 21. Each sprocket wheel 199 driven by the shafts 289 is shown as carried by the female member 301 of a friction cone clutch (Figs. 12, 25 and 26), to which member the sprocket wheel is secured by bolts 303. The hub portion 305 of the member 301 is rotatably mounted on the shaft 289, and is restrained against movement longitudinally of the shaft by collars 307 and 309 fixedly secured to the shaft at opposite sides of said hub. The male member 311 of the cone clutch is splined to the shaft by a longitudinally extending key 313, and is normally pressed into operative engagement with the female member of the clutch by a spring 315, this spring bearing at one end against the hub portion 317 of the male member and at its opposite end against a collar 319 fixed to the shaft 289.

As illustrated, the hub portion of the male member of each clutch is formed with an exterior circumferential groove 321 which receives the pins 323 carried by the bifurcations 325 of the bifurcated end of a clutch lever 327. As shown, the clutch lever is swingingly mounted on a pin 329 carried by a bracket 331 secured by bolts 333 to an angle-iron 335, this angle-iron, as shown in Fig. 20, extending horizontally from one post 267 to the adjacent post 267, to which posts its opposite ends are secured by welding. The bracket 331 is shown as having a projection 337 forming a so-called "quadrant," the latter being provided with an arcuate face 339 in which is formed a notch 341. Cooperating with the quadrant the clutch lever 327 carries a reciprocal dog 343 urged toward the quadrant face by a spring 345, so that the dog will snap into the notch 341 to hold the clutch in disengaged position when the lever 327 is swung sufficiently to the right, as viewed in Fig. 26. The dog may be withdrawn from the notch by depressing toward the lever 327 a lever 347, which latter is carried by the former adjacent its outer end and is connected to one end of a rod 349, the other end of which rod is connected to the dog. When the dog is withdrawn from the notch the clutch spring 315 will cause the clutch to engage. It will be observed that by use of the clutches any one or more coil rewinding tables 107 may be readily caused to cease rotating while the others are rotating.

The rollers 1 for the two innermost strips S at the rewinding platform or station R are supported as shown in Fig. 23. As illustrated, welded, as indicated at 351, to the outer sides of the two central longitudinally extending channel-irons 263 are blocks 353. Each of these blocks has a perforation 355 through which extends the screw-threaded lower end portion 357 of a spindle 359, the spindle being integrally formed with an exterior annular flange or collar 361 which rests on the upper surface of the block and is clamped thereto by a nut 363 screw-threaded on said lower end portion at the under side of the block. As shown, the web of each channel-iron is cut away, as indicated at 365, for permitting turning of the nut, and the platform top plates 129 are formed with openings 366 for permitting passage through the plates of the spindles and for receiving the lower end portions of the rollers. The roller 1 is in the form of a sleeve having internal annular flanges 367 against which abut the races 369 of the ball bearings 371, the cone-shaped races 373 of the ball bearings being carried by the spindle.

Each of the rollers 1 for the two outermost strips at the rewinding platform or station R is supported by a bar 375 (Fig. 24). At one end the bar rests on the upper flange of the adjacent transverse channel-iron 138, and is secured thereto by a bolt 377 extending through the flange and tapped into the bar. At its opposite end the bar rests upon the upper surface of a bracket 379 welded to the end channel-iron 265 of the rewinding platform, being secured to the bracket by bolts 381 tapped into the bar. The bar is formed with an opening 383 through which extends the screw-threaded lower end portion 357 of the roller spindle, a nut 363, as before, serving to clamp against the upper surface of the bar the annular flange 361 of the spindle.

The rollers 1 for the other strips are supported, in a manner similar to that illustrated by Fig. 24, on the bars 385, 387, 389 and 391 (see Fig. 21). These bars all rest upon the upper flanges of the channel-irons 138 and 139 adjacent the rollers, and are secured to said flanges by bolts 377 in exactly the same way as the bar 375 is shown in Fig. 24 as secured to the channel-iron 138 by such bolts. Each of the bars 385, 387, 389 and 391 likewise has an opening 383, so that the roller spindle may be attached thereto in exactly the same way as the spindle is attached to the bar 375 in Fig. 24. The bars 385 and 387 are alike, except that their openings 383 are spaced differently from the ends of the bars. The bars 389 and 391, as shown in Fig. 20, have their left hand ends projecting past the adjacent channel-iron 139, in which projecting ends are formed the openings 383 for securing the roller spindles to those bars.

The construction of the pay-off platform or station P is like that described for the rewinding platform or station R except that the rotary coil supporting tables at the pay-off platform are not driven, the coils C at the pay-off table being unwound by the rewinding of the coils $C_1$ at the rewinding platform.

As illustrated, each coil C at the pay-off platform or station P is supported on a rotary table 393 (Fig. 28). This table is supported, by the roller bearing 151, on a casting 395, the latter having upper flanges 137 resting upon the upper flanges of the transverse channel-irons 138 and 139, which flanges 137 are secured to these channel-irons by the bolts 147 tapped into the blocks 143 welded to the inner surfaces of the upper portions of the channel-irons. The vertical flanges 397 of the casting 395 rest against the outer sides of the webs of the channel-irons 138 and 139, and are secured to said channel-irons by bolts 149 tapped into blocks 145 welded to the lower portions of the inner surfaces of the channel-irons.

As shown, the casting 395 (Fig. 28) is provided with a boss 399, through the bore 401 of which extends the downwardly projecting spindle 403 formed integrally with the rotary table 393, the spindle being journalled on this bore to insure against lateral movement of the rotary table. The spindle is provided with a bore 405 which is square in cross-section for receiving the shank of the pin 121 which detachably secures to the rotary table the reel on which the coil C is wound. The lower end of the spindle 403 is shown as projecting below the boss 399, this projecting portion 407 being of reduced diameter. On this reduced diameter portion is mounted the hub 409 of a brake drum 411, the brake drum being secured to the spindle by a nut 413 screw-threaded on the lower end of the reduced diameter portion 407 of the spindle, and being prevented from rotation relative to the spindle by the key 415.

Relatively rotatably mounted on the hub 409 of the brake drum 411 is a collar 417, this collar being retained on the hub by a nut 419 screw-threaded on the upper reduced diameter portion 421 of the hub. Integrally formed with the collar are shown diametrically opposite radially extending arms 423. One of these arms is integrally formed with an upwardly projecting post 425 which is received between two lugs 427 projecting from and formed integrally with the boss 399 of the casting 395. These lugs by cooperation with the post hold the collar 417 against rotation when the table 393 and brake drum 411 rotate. Rigidly carried by each arm 423 is shown a downwardly projecting pin 429. On each pin is mounted for swinging in a horizontal plane a pair of members 431 and 433, the member 431 adjacent both its top and bottom edges having an ear 435 provided with a perforation through which the pin projects, and the member 433 having an ear 437 positioned between the ears 435, which ear 437 also is provided with a perforation through which the pin projects. To the opposite pairs of members 431 are riveted, at 439, the ends of a brake band 441, a like brake band 443 being riveted at each of opposite ends to the opposite members 433. These brake bands cooperate with the brake drums 411 to retard rotation of the pay-off tables 393 sufficiently to prevent their overrunning when rotation of the rotary coil rewinding tables is interrupted. As shown, each of the members 433 is provided at its free end portion with a screw-threaded perforation 445 through which is screw-threaded the shank 447 of a bolt, the end of this shank bearing against the free end portion of the adjacent member 431. By adjustment of these bolts the members 431 and 433 may be swung on their pivots to adjust the tension of the brake bands so as to decrease or increase the braking effect. Preferably the shanks 447 of the bolts are provided with lock nuts 449 for maintaining the bolts in their adjusted positions.

In operating the apparatus so far described, preparatory to heating up the furnace short lengths of strips may be threaded through it to extend from the pay-off platform or station P to the rewinding platform or station R. The ends of these strips at the rewinding station are then attached to reels placed on the rotary rewinding tables 107. Each strip conveniently is long enough to reach a point adjacent the rotary pay-off table 393 on which is to be mounted a coil C to be unwound by the reel to which the other end of the strip is attached. After the furnace is heated to an appropriate temperature coils C of strip are placed on the rotary pay-off tables, and the ends of the strips of these coils are attached to the ends of the strips threaded through the furnace. For so attaching the strips their ends may be joined together by use of a hand portable pneumatically or hydraulically operated automatic stapling tool employing tubular rivets, or one which deforms part of the metal of the strips for clinching their ends together, which tools are of known types and therefore need no further descriptions. The rotary rewinding tables may then be set in operation to draw the strips of the coils C on the rotary pay-off tables through the furnace.

When the end of each strip from a coil C reaches the reel on the rotary rewinding table the rotation of that table may be interrupted, and the strip detached from the short length of strip which has drawn it through the furnace by breaking away the attaching rivets or the like or by a shearing operation. The reel on the rewinding table containing the short length of strip may then be removed from that table and a new reel placed on it, to which latter the end of the strip from the coil C may be secured and the rotary rewinding table again be placed in operation for winding a coil $C_1$. The short length of strip on the reel may be retained thereon for use when the operation of the apparatus is to be discontinued without cooling off the furnace as explained below. In performing these operations the end of the strip from the coil C may be permitted to make several turns on the reel at the rotary rewinding table, which turns may be readily unwound when the reel is removed from the table. In this way sufficient slack in the strip is given to permit its end to be readily attached to the new reel placed on the rewinding table.

When the operator observes that a coil C of strip is about exhausted, rotation of the corresponding rotary rewinding table may be stopped and the remaining portion of the strip in the coil pulled off it by hand, whereupon a new coil C may be placed on the pay-off table and the free end of the strip of that coil attached to the end of the strip just pulled off the exhausted coil, and then the rotary rewinding table may be again placed in operation. When the end of the strip of the new coil C reaches the rotary rewinding table moving the strip rotation of that table may be again stopped and the end of the strip detached from the end of the strip of the coil $C_1$, whereupon the rewound coil may be removed from the rewinding table, a reel placed on that table, and the end of the strip of the new coil C attached to that reel, and then the rotary rewinding table may be again placed in operation.

In all of the above connections it will be observed that after a coil $C_1$ is formed the reel on which it is wound may be readily slipped from the coil for reuse.

The above described operations of attaching the strip of a coil C to the end of a strip extending through the furnace to the rewinding platform, and disconnecting these attached ends at the rewinding platform, may be performed very rapidly, so that the portion of the strip in the furnace does not remain stationary long enough to heat treat it materially differently from the other portions of the strip. These operations are facilitated by the fact that commonly but one coil C becomes exhausted at a time. It will be understood in these connections that the strip moves through the furnace relatively slowly. The speed with which it must be moved will of course depend upon the degree to which it is to be annealed, the length of the furnace, the temperature at which the furnace is maintained, the thickness of the strip, and the specific heat and other characteristics of the metal of which the strip is formed. As a rough average, when annealing brass strips a given portion of the strip will be in the furnace about one minute if the furnace is about twenty feet long and is maintained at about 1500° F., which means that under such conditions the strip will have a linear speed of roughly twenty feet per minute. If the reel employed for rewinding the strip is eight inches in diameter, and the completely rewound coil has an outside diameter of eighteen inches, the speed of rotation of the rotary rewinding table will be roughly about 9 R. P. M. at the start of the rewinding operation and roughly about 5 R. P. M. at the end of that operation. In operation of course the speed of rotation of the rewinding table will vary widely from these rough averages, and the values just given are therefore intended to be merely illustrative of the fact that the speed under all conditions is relatively slow.

If it is desired to discontinue operation of the apparatus for any length of time without cooling off the furnace, short lengths of strip may be threaded through the furnace and left there for the duration of such discontinuance of operations. These lengths of strip may be so threaded by attaching at the pay-off platform their ends to the ends of strips being rewound into coils at the rewinding platform, so as to draw them through the furnace, whereupon their ends may be detached at the rewinding platform from the strips being rewound. When the apparatus is again to be placed in operation the ends of the strips threaded through the furnace may be attached to reels on the rotary rewinding tables and their opposite ends attached to the ends of the strips of coils on the rotary pay-off tables, the same as when the furnace is initially put into operation as above described.

The steps of stopping and starting the operation of the rotary rewinding table may be performed by opening and closing the control switch for the motor 291 driving such table, which switch conveniently may be positioned on a panel adjacent the pay-off table. Alternately, the rotary rewinding table may be stopped and started, without interrupting and establishing operation of the motor 291, by disengaging and engaging the clutch controlling the rotation of that table. If desired, to avoid the necessity of an operator at the pay-off table signaling an operator at the rewinding table to operate the clutches, the clutches may be controlled from a panel adjacent the pay-off table by employing the arrangement schematically illustrated in Fig. 33. According to this arrangement, each sprocket wheel 199 on the several shafts 289 is controlled by a separate electro-magnetic clutch schematically indicated at 451, the energizing coil for the clutch being schematically indicated at 453. Each of these energizing coils is shown as controlled by a switch having a movable switch arm 455 and a contact 457, the switch conveniently being positioned on a panel adjacent the pay-off table. As shown, the switch arms of all these switches are connected into one side 459 of a line, this line having its opposite side 461 connected by leads 463 to one terminal of each energizing coil 453, while the contact 457 of each switch is connected by a lead 465 to the opposite terminal of an energizing coil. By closing and opening the switches the clutches 451 will be engaged and disengaged, respectively, to establish and interrupt rotation of the associated sprocket wheels 199.

Instead of employing the relatively shiftable friction disk 161 and friction pinion 191 for securing a constant linear speed of the strip through the furnace, the arrangement, more or less diagrammatically shown by Figs. 31 and 32, may be employed. As shown in Fig. 31, the rotary rewinding table 467, for the coil $C_1$ being rewound, is supported by a roller bearing, diagrammatically shown at 469, on a casting 471 carried by the channel-irons 138 and 139, the table having a vertically disposed spindle 473 journalled in the bore 475 of the depending boss 477 of the casting. At its lower end the spindle 473 is shown as fixedly carrying a bevel gear 479 meshing with a bevel pinion 481 fixedly secured to a shaft 483. This shaft, as shown, is journalled in bearings 485 carried at the under side of the casting 471, the shaft being prevented from longitudinal movement relative to the bearings by the collars 487. Carried by the shaft 483 in fixed relation thereto is a sprocket wheel 489 driven, through a chain 491, by a sprocket wheel 493. The sprocket wheel 493 is shown as driven by a variable speed electric motor 495 through a change speed gearing, the casing of which latter is shown at 497, this gearing being provided with a shift lever 499 for changing the gear ratio, at the will of the operator, for determining the linear speed at which the strip will be rewound into the coil $C_1$.

The variable speed electric motor 495 may be of any suitable type. Such motors all have, in general, means controlled by a switching device for effecting their electric characteristics which determine their speed of rotation, so that by operation of the switching device the speed of rotation of the motor may be varied. For illustrative purposes, the motor 495 is indicated in Fig. 32 as a shunt wound direct current motor, the speed of rotation of which for a given impressed electromotive force is dependent upon the strength of its field determined by the current flowing through its field winding 501. As schematically indicated in Fig. 32, the armature of the motor is connected by leads 503 across a line presented by the leads 505 and 507, while in series with the field winding is a tapped resistance 509. As shown, the several taps of this resistance are connected by separate leads 511 to the contacts 513 of a series of contacts with which cooperates the movable switch arm 515, this switch arm being connected by a lead 517 to the side of the line 507. In the position of parts shown by Fig. 33 the resistance in series with the field winding 501 is at a maximum, under which conditions the field strength of the motor is at a minimum and the motor will rotate at its maximum speed corresponding to initiating rewinding of the strip on the reel positioned on the rotary rewinding table driven by the motor. By progressively turning the switch arm 515 counter-clockwise, as the diameter of the coil $C_1$ progressively increases, the resistance in series with the field winding 501 will be progressively decreased for progressively increasing the field strength of the motor and thus causing it to rotate progressively slower, so that when the coil $C_1$ is completely rewound the speed of rotation of the motor will be at a minimum. By controlling the rotation of the switch arm in this way the linear speed at which the strip travels while it is being rewound may be maintained substantially constant in the sense that such speed does not vary enough to cause different portions of the strip to be materially differently heat treated while passing through the furnace.

As shown in Fig. 31, the switch arm 515, cooperating with the contacts 513, is connected to the hub 519 of a spur gear 521 in electrically insulated relation thereto, this gear being rotatably mounted on a pin 523. This pin is shown as fixedly carried by the top wall 525 of a casing 527, the casing being secured to the under sides of the channel-iron 138 and a second channel-iron 529 so that the casing is rigidly supported. The gear 521 is rotated by a meshing spur gear 531, of somewhat larger diameter, so that for rotation of the gear 531 through a given angle the gear 521 will move the switch arm 515 through a greater angle. The spur gear 531 is shown as fixedly connected to a vertical spindle 533, this spindle being journalled in the bore 535 of the boss 537 formed integrally with the top wall of the casing 527. The spindle 533 extends upwardly through an opening 539 in the rewinding platform top plate 541, the upper portion of the spindle fixedly carrying a lever arm 543, on the free end of which latter is mounted a roller 545. This roller is adapted to bear against the reel 108 at the start of the rewinding operation, as schematically shown in Fig. 32, and to bear continuously against the coil $C_1$ as the strip S is rewound to form that coil. Consequently, as the diameter of the coil $C_1$ progressively increases, the lever 543 will swing to cause the switch arm 515 to move over the contacts 513 so as progressively to decrease the speed of rotation of the motor.

In operating the apparatus according to Figs. 31 and 32 all the operator ordinarily need do in respect to the roller is to move it against the reel at the start of the rewinding operation. However, if desired, a spring 547, schematically shown in Fig. 32, may be employed for this purpose. In an obvious manner, when employing the apparatus according to Figs. 31 and 32, the rotary tables at the rewinding platform may be separately stopped and started by deenergizing and energizing the motors 495 by use of switches in the line 505, 507, which switches may be conveniently located on a panel adjacent the pay-off table.

It is also possible to employ a single motor for driving all the rotary coil rewinding tables 107, as is diagrammatically shown in Fig. 27. According to Fig. 27, a single electric motor 549, through a reducing gear the casing of which is shown at 551, may drive in opposite directions, respectively, the lay shafts 553 and 555. As shown, each of these shafts is provided with a pair of sprocket wheels 557, each of which wheels through a chain 559 drives a sprocket wheel 561. Each sprocket wheel 561, through a reducing gearing the casing of which is shown at 563, drives one of the shafts 289 having the sprocket wheels 199 connected to those shafts by the clutch mechanism hereinbefore described. These sprocket wheels 199, as hereinbefore described, through chains 197 drive the sprocket wheels 195 on the shafts 173, on which shafts are the friction pinions 191 for rotating the friction disks 161.

In operating the apparatus according to Fig. 27 the gear shift levers 565 for the reducing gears 563 will be set by the operator to secure the desired linear speeds of the strips moved by rotation of the shafts 289. Rotation of the rotary coil rewinding tables may be stopped and started by closing and opening the control switch for the electric motor 549, which switch may be conveniently positioned on a panel adjacent the pay-off table, or each rotary rewinding table may be stopped and started by operation of the associated clutch lever 327. It will also be understood that in connection with the arrangement shown by Fig. 27 the electro-magnetic clutches heretofore described for controlling the driving of the sprocket wheels 199 may be employed in place of mechanically operated clutches, the switches for controlling the electro-magnetic clutches as heretofore explained being conveniently positioned on a panel adjacent the pay-off table.

It will be understood that within the scope of the appended claims wide deviations may be made from the forms of the invention above illustrated and described without departing from the spirit of the invention.

I claim:

1. Apparatus for heat treating metallic strips comprising a horizontally extending strip heating chamber, mountings for rotatably supporting a plurality not less than three of coils of the strip, reel driving mechanism for moving strips from such coils through said chamber in the same direction and winding each into a coil, means for guiding the strips horizontally through said chamber in relatively closely spaced opposed relation on edge with their top and bottom edges in spaced relation to the top and bottom walls of said chamber, and means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips, said reel driving mechanism having provision for moving different strips at different overall speeds through said chamber at the will of the operator.

2. Apparatus for heat treating elongated metallic strips comprising a plurality not less than three of supports each for rotatably supporting a coil of strip with its axis vertically disposed, a longitudinally extending heating chamber, a plurality of reel rotating devices for subjecting said strips to tension for keeping them straight and drawing them from said coils through said chamber and winding them into coils having vertically disposed axes, said chamber being positioned between said supports and reel rotating devices with respect to the portions of the strips in said chamber, means for guiding the strips through said chamber in relatively closely spaced opposed relation on edge with their top and bottom edges in spaced relation to the top and bottom walls of said chamber, means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips, and operator controlled variable speed driving means for said reel rotating devices for rotating different reels at different speeds at the will of the operator whereby to draw different strips at different overall speeds through said chamber.

3. Apparatus for heat treating elongated metallic strips comprising a plurality not less than three of supports each for rotatably supporting a coil of strip with its axis vertically disposed, a longitudinally extending heating chamber, a plurality of reel rotating devices for subjecting said strips to tension for keeping them straight and drawing them from said coils through said chamber and winding them into coils having vertically disposed axes, said chamber being positioned between said supports and reel rotating devices with respect to the portions of the strips in said chamber, means for guiding the strips through said chamber in relatively closely spaced opposed relation on edge with their top and bottom edges in spaced relation to the top and bottom walls of said chamber, means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips, and operator controlled variable speed driving means for said reel rotating devices for rotating different reels at different speeds at the will of the operator whereby to draw different strips at different overall speeds through said chamber.

4. Apparatus for heat treating elongated metallic strips comprising a plurality not less than three of supports each for rotatably supporting a coil of strip with its axis vertically disposed, a longitudinally extending heating chamber, a plurality of reel rotating devices for subjecting said strips to tension for keeping them straight and drawing them from said coils through said chamber and winding them at a substantially constant linear speed into coils having vertically disposed axes in direct response to increases in the diameters of such coils, said chamber being positioned between said supports and reel rotating devices with respect to the portions of the strips in said chamber, means for guiding the strips through said chamber in relatively closely spaced opposed relation on edge with their top and bottom edges in spaced relation to the top and bottom walls of said chamber, and means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips.

5. Apparatus for heat treating elongated metallic strips comprising a plurality not less than three of supports each for rotatably supporting a coil of strip with its axis vertically disposed, a longitudinally extending heating chamber, a plurality of reel rotating devices for subjecting said strips to tension for keeping them straight and drawing them from said coils through said chamber and winding them at a substantially constant linear speed into coils having vertically disposed axes, means for guiding the strips through said chamber in relatively closely spaced opposed relation on edge with their top and bottom edges in spaced relation to the top and bottom walls of said chamber, means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips, and operator controlled variable speed driving means for said reel rotating devices for rotating different reels at different speeds at the will of the operator whereby to draw different strips at different overall speeds through said chamber.

6. Apparatus for heat treating metallic strips comprising a furnace having an elongated horizontally extending chamber, means for passing three or more relatively closely spaced opposed strips on edge horizontally through said chamber with their top and bottom edges in spaced relation to the top and bottom walls of said chamber, and means for entering a heating medium into the space between one of said walls and the adjacent opposed edges of the strips and flowing it through the spaces between the strips and over the outer faces of the outermost strips to the space between the other of said walls and the opposite edges of the strips in distributed relation longitudinally of the strips while said strips are passing through said chamber.

7. Apparatus for heat treating metallic strips comprising a furnace having an elongated horizontally extending chamber, means for passing three or more relatively closely spaced strips on edge horizontally through said chamber, said furnace having fluid fuel burners, means for directing the products of combustion from said burners to the upper portion of said chamber above said strips, and distributed outlet ports for said chamber below said strips whereby to cause such products of combustion to flow through the spaces between said strips for heating them.

8. Apparatus for heat treating metallic strips comprising means forming an elongated horizontally extending chamber, means for passing three or more relatively closely spaced strips on edge horizontally through said chamber, and means for passing a gaseous heating medium vertically through the spaces between said strips while the latter are passing through said chamber.

9. Apparatus for heat treating elongated metallic strips comprising a plurality of rotary tables each for supporting a coil of strip with its axis disposed vertically, a brake associated with each of said tables for exerting a force opposing rotation thereof, a longitudinally extending heating chamber, a second plurality of rotary tables each for supporting a reel with its axis disposed vertically for drawing through said chamber strip from one of said coils against the opposing force of the brake associated with the table on which the coil is mounted and rewinding such strip into a coil, means for guiding the strips horizontally through said chamber on edge in relatively closely spaced opposed relation, and in exposed relation to the interior of said chamber, means for passing a heating medium through the spaces between said strips while in said chamber for heating them, driving mechanism for the reel supporting tables having provision for driving different tables at different speeds and for interrupting rotation of any of them while at least some of them are being rotated, said driving mechanism having coil contacting means associated with each reel supporting table for causing that table to wind strip into a coil supported by it at a constant linear speed.

10. Apparatus for heat treating elongated metallic strips comprising an elongated heating chamber, means at the exterior of said chamber for subjecting a plurality not less than three of the strips to longitudinal tension for keeping them straight and passing them in relatively closely spaced opposed relation horizontally on edge through said chamber in the same direction with their top and bottom edges in spaced relation to the top and bottom walls of said chamber and with them in exposed relation to the interior of said chamber, and means for entering a heating medium into the space between one of said walls and the adjacent opposed edges of the strips and flowing it through the spaces between said strips and over the outer faces of the outermost strips to the space between the other of said walls and the opposite edges of the strips and discharging it from the last mentioned space at points distributed longitudinally of the strips for causing said medium to heat the strips while so passing through said chamber.

11. Apparatus for heat treating elongated metallic strips comprising an elongated horizontally extending strip heating chamber, mountings for rotatably supporting a plurality not less than three of coils of the strips at the exterior of said chamber, reel driving mechanism at the exterior of said chamber for subjecting said strips to longitudinal tension for keeping them straight and drawing them from such coils through said chamber in the same direction and rewinding each into a coil, means for guiding the strips into and out of said chamber for causing them to pass therethrough horizontally on edge in relatively closely spaced opposed relation with their top and bottom edges in spaced relation to the top and bottom walls of said chamber and with them exposed to the interior of said chamber, and means for entering a heating medium into the space between one of said walls and the adjacent opposed edges of the strips and flowing it through the spaces between said strips and over the outer faces of the outermost strips to the space between the other of said walls and the opposite edges of the strips and discharging it from the last mentioned space at points distributed longitudinally of the strips for causing said medium to heat the strips while so passing through said chamber.

12. Apparatus for heat treating elongated metallic strips comprising an elongated horizontally extending strip heating chamber, mountings for rotatably supporting a plurality not less than three of coils of the strips at the exterior of said chamber, reel driving mechanism at the exterior of said chamber for subjecting said strips to longitudinal tension for keeping them straight and drawing them from such coils through said chamber in the same direction and rewinding each into a coil, means for guiding the strips into and out of said chamber for causing them to pass therethrough horizontally on edge in relatively closely spaced opposed relation with their top and bottom edges in spaced relation to the top and bottom walls of said chamber and with them exposed to the interior of said chamber, means for entering a heating medium into the space between one of said walls and the adjacent opposed edges of the strips and flowing it through the spaces between said strips and over the outer faces of the outermost strips to the space between the other of said walls and the opposite edges of the strips and discharging it from the last mentioned space at points distributed longitudinally of the strips for causing said medium to heat the strips while so passing through said chamber, said reel driving mechanism having provision for varying the overall speed of travel of the strips through said chamber at the will of the operator.

13. Apparatus for heat treating elongated metallic strips comprising a plurality not less than three of supports each for rotatably supporting a coil of strip with its axis vertically disposed, an elongated longitudinally extending heating chamber, a plurality of reel rotating devices for subjecting said strips to longitudinal tension for keeping them straight and drawing them from said coils through said chamber and rewinding them into coils having vertically disposed axes, said chamber being positioned between said supports and reel rotating devices with respect to the portions of the strips in said chamber, means for guiding the strips into and out of said chamber for causing them to pass therethrough horizontally on edge in relatively closely spaced opposed relation exposed to the interior of said chamber, and means for entering a heating medium into the space between one of said walls and the adjacent opposed edges of the strips and flowing it through the spaces between said strips and over the outer faces of the outermost strips to the space between the other of said walls and the opposite edges of the strips and discharging it from the last mentioned space at points distributed longitudinally of the strips for causing said medium to heat the strips while so passing through said chamber.

14. Apparatus for heat treating elongated metallic strips comprising a plurality not less than three of supports each for rotatably supporting a coil of strip with its axis vertically disposed, an elongated longitudinally extending heat treating chamber, a plurality of reel rotating devices for subjecting said strips to longitudinal tension for keeping them straight and drawing them from said coils through said chamber and rewinding them into coils having vertically disposed axes, said chamber being positioned between said supports and reel rotating devices with respect to the portions of said strips in said chamber, means for guiding the strips into and out of said chamber for causing them to pass therethrough horizontally on edge in relatively closely spaced opposed relation exposed to the interior of said chamber, and means for entering a heat treating medium into the space between one of said walls and the adjacent opposed edges of the strips and flowing it through the spaces between said strips and over the outer faces of the outermost strips to the space between the other of said walls and the opposite edges of the strips and discharging it from the last mentioned space at points distributed longitudinally of the strips for causing said medium to heat treat the strips while so passing through said chamber.

JOHN FRENCH.

REFERENCES CITED

The following references are of record in the file of this patent:

UNITED STATES PATENTS

| Number | Name | Date |
| --- | --- | --- |
| 510,352 | Logan | Dec. 5, 1893 |
| 947,344 | Nicholson | Jan. 25, 1910 |
| 1,827,079 | Fahrenwald | Oct. 13, 1931 |
| 1,844,094 | Kneass, Jr. | Feb. 9, 1932 |
| 2,278,136 | Otis et al. | Mar. 31, 1942 |
| 2,351,987 | Lynn | June 20, 1944 |
| 2,409,770 | Lorig et al. | Oct. 22, 1946 |

FOREIGN PATENTS

| Number | Country | Date |
| --- | --- | --- |
| 329,174 | Germany | 1920 |
| 678,910 | Germany | July 24, 1939 |
| 144,922 | Switzerland | Jan. 21, 1931 |